United States Patent [19]

Kishikawa et al.

[11] Patent Number: 5,176,300
[45] Date of Patent: Jan. 5, 1993

[54] POURING PLUG FOR LIQUID PAPER-CONTAINERS

[75] Inventors: Kenjiro Kishikawa, Osaka; Toshiaki Nomura, Kyoto, both of Japan

[73] Assignee: Toppan Printing Co., Ltd., Tokyo, Japan

[21] Appl. No.: 634,912

[22] Filed: Dec. 27, 1990

[30] Foreign Application Priority Data

Dec. 28, 1989 [JP] Japan .............................. 1-151948[U]

[51] Int. Cl.⁵ ............................................. B65D 47/10
[52] U.S. Cl. .................................. 222/541; 220/265; 493/87
[58] Field of Search ........................ 222/541, 556, 569; 220/265, 359; 229/125.14, 125.15; 156/69; 493/87; 53/478, DIG. 2; 264/23; 215/232

[56] References Cited

U.S. PATENT DOCUMENTS

| | | | |
|---|---|---|---|
| 4,669,640 | 6/1987 | Ando et al. | 222/541 |
| 4,948,015 | 8/1990 | Kawajiri et al. | 222/107 |
| 4,964,562 | 10/1990 | Gordon | 493/87 |

*Primary Examiner*—Andres Kashnikow
*Assistant Examiner*—Philippe Derakshani
*Attorney, Agent, or Firm*—Armstrong, Nikaido, Marmelstein, Kubovcik & Murray

[57] ABSTRACT

The present invention relates to a pouring plug used for paper containers filled with juice, milk and the like. The present invention further relates to a pouring plug having a flange portion corresponding to a peripheral surface portion of a fitting hole of a container body and being mounted from inside of the container body, in which a plurality of projecting portions are provided, at a height position larger than a thickness dimension of a structural member of the container body form the flange portion, and on the peripheral surface portion corresponding to the inner peripheral edge of the fitting hole. When the pouring plug is inserted and arranged in the fitting hole, the projecting portions are completely withdrawn on the surface side of the container body so that the plug is positively temporarily fixed, and ultrasonic deposition can be carried out without any trouble.

4 Claims, 7 Drawing Sheets

FIG.4
FIG.5
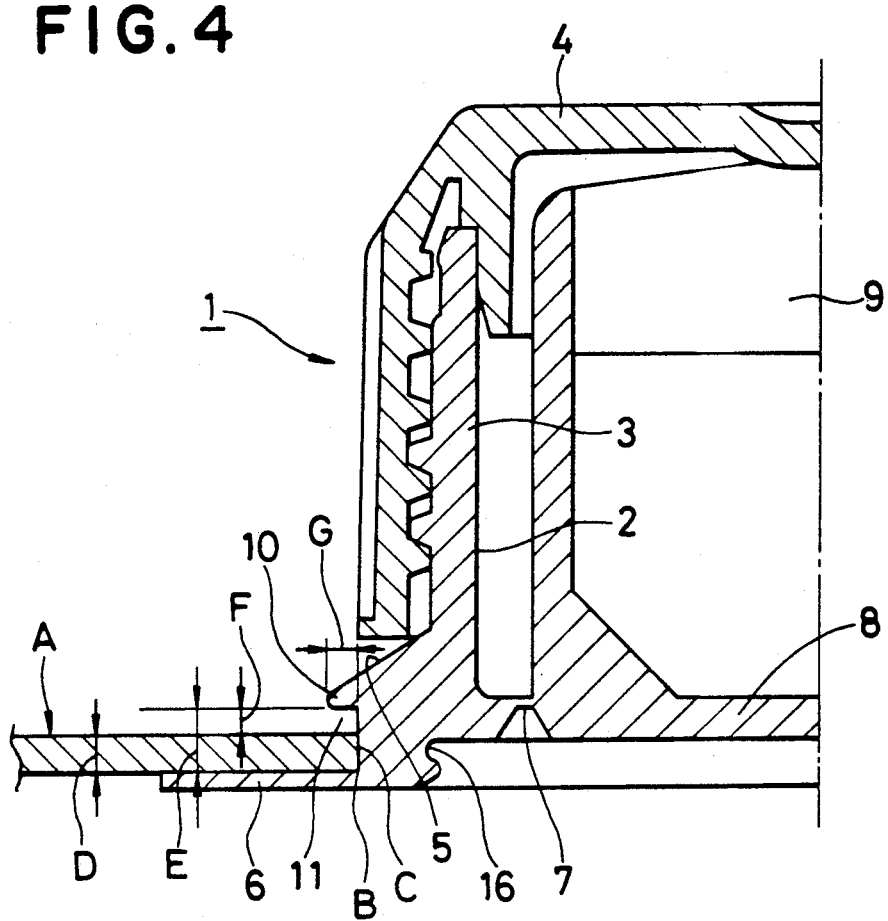
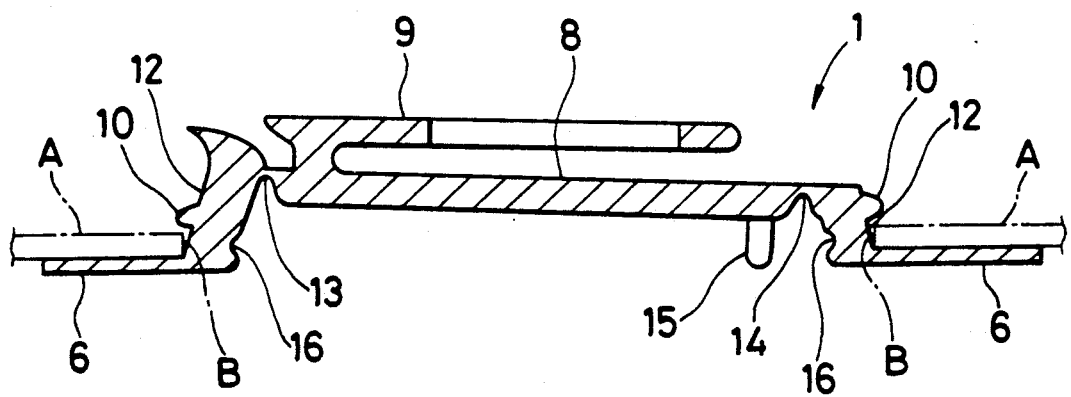

POURING PLUG FOR LIQUID PAPER-CONTAINERS

BACKGROUND OF THE INVENTION

1. Field of the Invention

The present invention relates to a pouring plug used for paper containers filled with juice, milk and the like.

2. Description of the Prior Art

A conventional pouring plug of this kind comprises a substantially cylindrical pouring member having a flange corresponding to a peripheral surface portion of a fitting hole formed in a container body and a cap threadedly attached so as to cover the pouring member, the pouring plug being fitted into the fitting hole from inside of the container body.

As shown in FIG. 8, a pouring plug 100 of this kind comprises a substantially cylindrical pouring member 101 and a cap 103 threadedly attached so as to cover a cylindrical portion 102 of the pouring member 101. In the pouring member 101, a shoulder 104 is located at a base end of the cylindrical portion 102, the shoulder 104 being registered with a fitting hole B of a container body A, and the shoulder 104 being integrally provided therearound with a flange portion 105 corresponding to a peripheral surface (an inner surface side) of the fitting hole B (See, for example, Japanese Utility Model Application No. 62-62515 (Japanese Utility Model Application Laid-Open No. 63-169429) previously filed by the present applicant). This flange portion 105 is secured to the container body A by ultrasonic deposition, for example, as will be described hereinafter. The cylindrical portion 102 of the pouring member 101 is interiorly integrally provided with a lid 107 through a thin-wall portion 106. By pulling a pull-ring 108 provided on the lid 107, the thin-wall portion 106 is torn to remove the lid 107 and the container is opened.

As a device used for liquid paper-containers similar to that described above, there is a pouring plug 109 having a small height dimension, as shown in FIG. 9. This pouring plug 109 is constructed so that a lid 112 is integral with a top portion 110 having a projected shape through a thin-wall portion 111, and the thin-wall portion 111 is torn and opened by pulling up a pull ring 113 provided on the lid 112 in a manner similar to the case of the aforementioned pouring member 101. The lid 112 is turned through a self-hinge portion 114 positioned at the base end of the lid 112 to open and close an opened opening. The top portion 110 is integrally provided in its outer peripheral portion 115 with a flange portion 116, the flange portion 116 being secured to the container body in a manner similar to that described above.

Projecting portions a are integrally provided, as shown, in the vicinity of the flange portion 116 of the pouring plug 109. The projecting portions a have a small height dimension and are at the shoulder 104 of the pouring plug 100 of the type having the cylindrical portion 102 as described above, whereby the inner peripheral edge of the fitting hole B of the paper container body A is held by the projecting portions a and the flange portions 105 and 116 when the pouring plug is temporarily mounted for reasons to be described later.

In mounting the pouring plug from inside of the container body as described above, it is mounted and fixed by depositing the flange portion onto the peripheral surface of the fitting hole by, for example, ultrasonic vibrating deposition, heat seal or the like. As disclosed in Japanese Patent Publication No. 60-50,139, Japanese Utility Model Application Laid-Open No. 61-100,517, U.S. Pat. No. 4,788,811 specification, Japanese Patent Publication No. 64-2,505, etc., the step of mounting a pouring plug to a container body is included in a series of steps including the assembly of a flat sleeve (prior to formation of a bottom portion of a container body), filling contents, and heat seal of a top of a container body. As shown in FIG. 10, a flat-state sleeve 117 is supplied to a line from an assembly of the sleeve to the heat seal of the top of the container body, and the assembly of the sleeve 117 is sequentially carried out (Step I). After the sleeve 117 has been assembled into a rectangular shape, the bottom portion is formed (flaps at the bottom are cemented) (Step II).

Next, the pouring plug 100 is fitted on the container body A in which the bottom is formed and the top is opened (Step III). In this Step III, for example, a plurality of pouring plugs 100 in an aligned state are supplied by a guide 118 (for example, see the aforesaid U.S. Pat. No. 4,788,811 specification), the pouring plugs are removed one by one by a sucker 119 with vacuum action, and the sucker 119 with the pouring plug 100 held thereon is inserted from the opened top of the container body A held in a predetermined position. The sucker 119 inserts the pouring plug 100 from inside into the fitting hole B of the container body A, and the pouring plug 100 is arranged. A pad-plate not shown is applied to the outer portion of the fitting hole B (Step IIIa).

When the pouring plug 100 is arranged in the fitting hole B, the container body A is moved to an ultrasonic depositing machine 120 (Step IIIb).

When the container body A reaches a final fitting position of the pouring plug 100, an anvil 121 enters from the top of the container body A, a horn 120a of the ultrasonic depositing machine 120 is applied around the fitting hole B, and the ultrasonic deposition is carried out wherein the flange portion 105 of the pouring plug 100 and the container body A are held by the anvil 121 and the horn 120a (Step IIIc).

Upon termination of fitting and fixing of the pouring plug 100, the container body A is moved to a liquid filling machine 122, and filling is effected at a predetermined position (Step IV).

Upon termination of filling, the container body a is moved, and the top of the container body A is sealed at a predetermined position by a device 123 such as a sealer (Step V).

During the ultrasonic deposition of the pouring plug after the pouring plug has been arranged in the fitting hole, that is, the container body is moved in the aforesaid Step IIIb, it is necessary to prevent the pouring plug from being displaced or slipped out due to vibrations caused by said movement. When the pouring plug is displaced or slips out, there arises situations such as subsequent ultrasonic deposition cannot be positively carried out, a defective deposition of the pouring plug occurs, or the operation of the ultrasonic depositing machine has to be stopped.

In view of the above, a device has been made to temporarily fix the pouring plug to the container body. This is a technique in which as described above, the projecting portions are provided, at a height position having a paper-thickness dimension from the flange portion, on the peripheral edge at the lower position of the cap and on the peripheral edge at the lower end of the cylindrical portion of the pouring member (for example. see Japanese Utility Model Publication No. 61-7147).

The problem posed here is that these pouring plugs are generally manufactured of relatively soft synthetic resins such as high-density polyethylene. As described above, a dimension d1 between the projecting portion a and the flange portion 105 is the same as a paper thickness d2 of the container body, as shown in FIG. 11. Therefore, when the pouring plug is inserted and arranged into the fitting hole, the projecting portion a impinges upon an inner peripheral edge C of the fitting hole B and becomes deformed whereby the peripheral portion of the fitting hole cannot be held by the projecting portion a and the flange portion 105. Furthermore, there arises a state where the deformed projecting portion a cannot be completely withdrawn on the surface side.

Because of this, the pouring plug slips out during the movement in the aforesaid Step IIIb despite the provision of a device with a projecting portion intend to prevent the pouring plug from being displaced or from slipping out.

On the other hand, when the pouring plug is forcibly pushed to move the projecting portion on the surface side by the method of increasing the pressing force of the sucker, the inner peripheral edge C of the fitting hole B becomes scratched as shown in FIG. 12 because the container is made of paper, posing an inconvenience of being unattractive in external appearance.

From the foregoing, there is contemplated that a pouring plug molded from a synthetic resin which is harder than the high density polyethylene generally used (that is, the hardness of the projecting portion is enhanced).

According to the means for making the projecting portion harder, the projecting portion is small in deformation and is withdrawn on the surface side and can be positively engaged. However, conversely, the inner peripheral edge C of the fitting hole B is cut, being unattractive in external appearance.

Similarly, even if the projecting portion is sharpened to facilitate withdrawal of the projecting portion on the surface side or the length of the projecting portion is lengthened along the circumference to make engagement positive, the inner peripheral edge C of the fitting hole B becomes unfavorably scratched because of the paper-made container.

Another problem lies in that the pouring plug has its flange portion deposited by the ultrasonic depositing machine as described above. However when deposited, ultrasonic vibrating energy tends to be concentrated on the aforementioned thin-wall portion, and therefore the thin-wall portion becomes dissolved thereby producing pin holes.

SUMMARY OF THE INVENTION

The present invention is directed to the structure of a projecting portion that is completely withdrawn on the surface side of a container body when a pouring plug is inserted and arranged in a fitting hole, without impairing an external appearance of a peripheral edge of the fitting hole of a paper container, so as to assume a state where the inner peripheral edge of the fitting hole is positively positioned in a very narrow space between the projecting portion and a flange portion. A main object of this invention is to minimize obstacles to the processing step of ultrasonic deposition. It is a further object of the invention to provide an arrangement wherein a thin-wall portion is torn to thereby open an opening, and pin holes are not produced in the thin-wall portion at the time of ultrasonic deposition.

The present invention has been accomplished in consideration of the aforesaid task. The aforesaid task is overcome by the present invention by providing a pouring plug having a flange portion corresponding to a peripheral surface of a fitting hole of a container body and being fitted from inside of the container body. The pouring plug for a liquid paper-container or the like is characterized in that a plurality of projecting portions are provided at a height position greater than a thickness dimension of a structural member of the container body from the flange portion.

In the present invention, the clearance between the flange portion and the projecting portion is larger than the thickness dimension of the structural member of the container body, and when the pouring plug is fitted, the projecting portion is completely withdrawn before the flange portion comes into contact with the peripheral surface of the fitting hole (inner surface of the container body). After the pouring plug has been fitted by the sucker, vibrations are transmitted to the pouring plug by the movement of the container body or the like. Despite the slight deviation, the projecting portion and the flange portion can impinge upon the peripheral edge of the fitting hole, and the temporary fitting state of the pouring plug is positively maintained before deposition. That is, the projecting portion comprises no resistance when fitting, and can be engaged after fitting.

BRIEF DESCRIPTION OF THE DRAWINGS

FIG. 4 is an explanatory view showing in section essential parts of a third embodiment;

FIG. 5 is an explanatory view showing in section a fourth embodiment;

PREFERRED EMBODIMENTS

Figure 1:
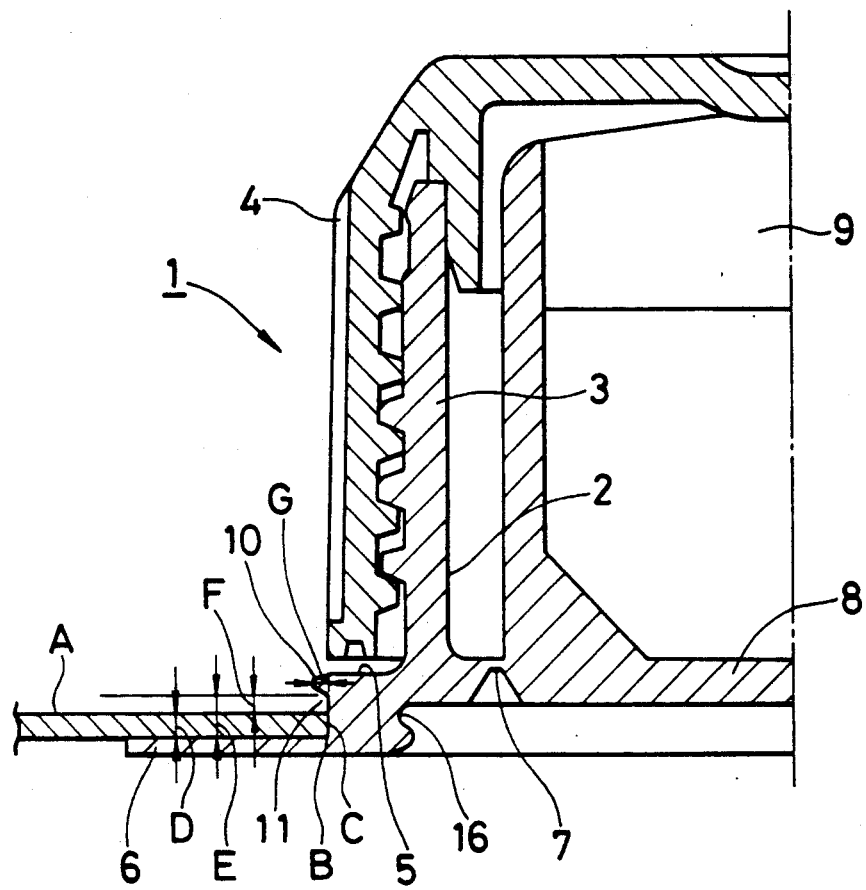
FIG. 1 is an explanatory view showing in section essential parts of one embodiment of a pouring plug for a liquid paper-container or the like according to the present invention.

The present invention will be described in detail hereinafter in connection with the embodiments shown in FIGS. 1 to 7.

Reference numeral 1 designates a pouring plug. The pouring plug 1 comprises a substantially cylindrical pouring member 2 and a cap 4 threadedly mounted so as to cover a cylindrical portion 3 of the pouring member 2. The pouring member 2 has at its lower end a flange portion 6 corresponding to a peripheral surface (inner surface side) of a fitting hole B through a shoulder 5 registered with the fitting hole B of a container body A. The pouring member 2 is configured so that a lid 8 is provided interiorly of the cylindrical portion 3 through a thin-wall portion 7, and it is opened by pulling a pull-ring 9. The construction for unsealing the pouring member structure is not limited, however, to that described above.

In the pouring member 2 constructed as described above, a peripheral surface portion corresponding to an inner peripheral edge C of the fitting hole B, that is, the side of the shoulder 5 is provided with a projecting portion 10 at a height position greater than a thickness (that is, paper thickness) dimension D of a structural member of the container body from the flange portion 6. While in the drawing, one projecting portion is shown in section, it is to be noted that plural, preferably, three or more projecting portions 10 are provided along the peripheral surface of the shoulder 5.

As will be apparent from FIG. 1, a dimension E of a spacing between the flange portion 6 and the projecting portion 10 is larger than a dimension D of a thickness of the structural member of the container body so that after mounting of the pouring plug 1, a clearance 11 is obtained between the projecting portion 10 and the structural member. When the pouring plug 1 is mounted in the fitting hole, the projecting portion 10 gets over the inner peripheral edge C of the fitting hole B and is completely moved out before the flange portion 6 comes into contact with the peripheral surface of the fitting hole. Reference character F denotes a dimension of the clearance 11.

The thus fitted pouring plug 1 is supported in the state where the side of the shoulder 5 is in contact with the inner peripheral edge C of the fitting hole B. Even transmission of vibrations caused by the movement of the container body after fitting or even minute deviation, the projecting portion 10 and the flange portion 6 touch the edge of the fitting hole to completely prevent the pouring plug 1 from being slipped out. Thereby, the next step (i.e., deposition of the flange portion) can be carried out without any trouble.

Figure 2:
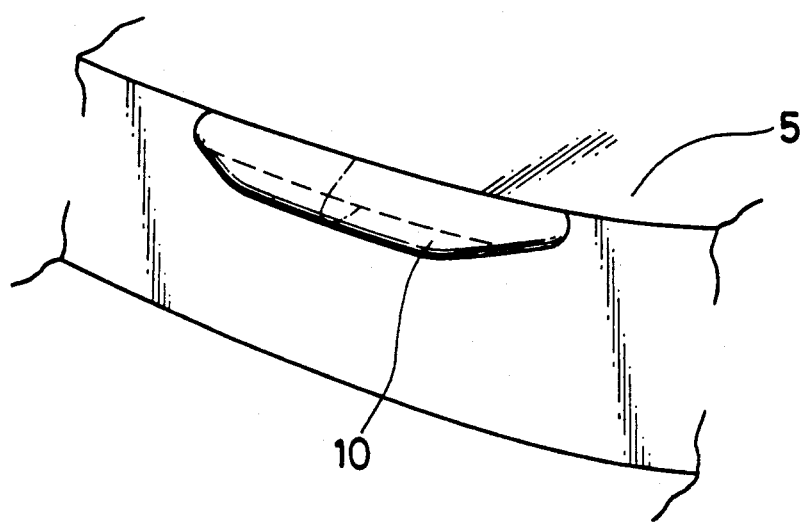
FIG. 2 is an explanatory view showing a projecting portion.

In the projecting portion 10, a dimension G projected externally of the projecting portion 10 is fulfilled with the condition that even if the extreme end of the pouring plug 1 is deformed when fitting, it does not touch the structural member of the container. More specifically, the dimension G is less than the dimension F, and even if the plug is deformed, it can be easily restored. It is not projected at an acute angle but the extreme end is provided with a roundish curve to have a roundness laterally as well as longitudinally as shown in FIG. 2. It is integrally molded in a state of having a width to some extent in a lateral direction so that when being mounted, the inner peripheral edge of the fitting hole is not scratched.

Figure 3:
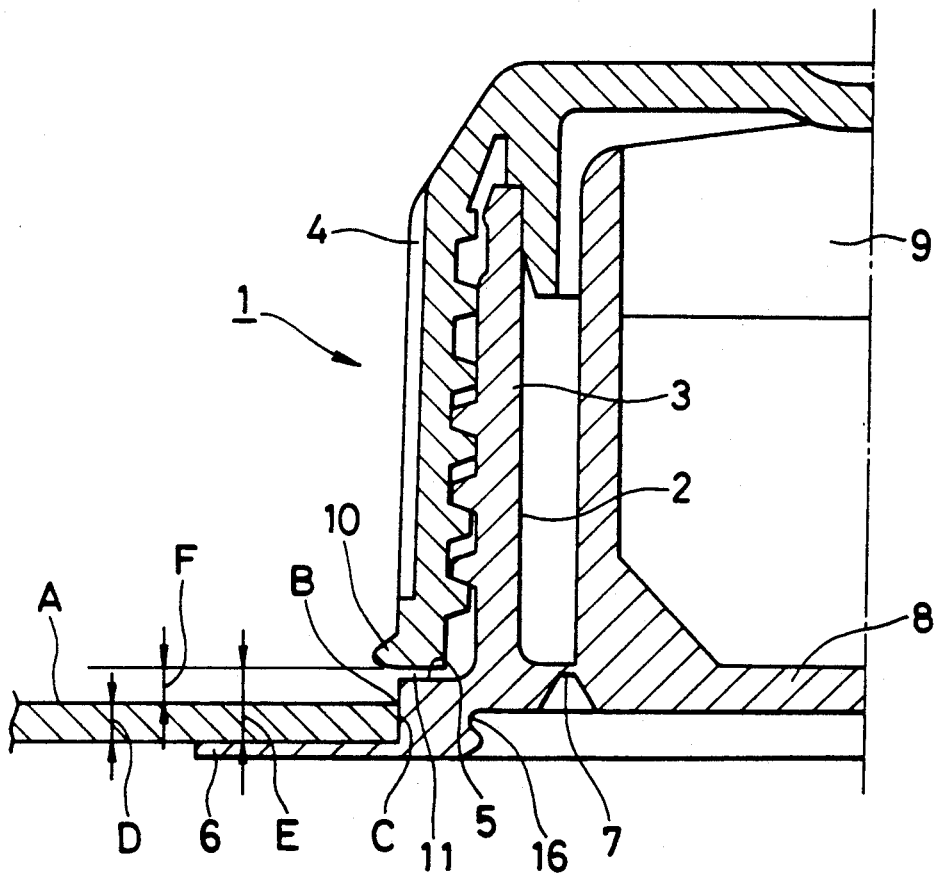
FIG. 3 is an explanatory view showing in section essential parts of a second embodiment.

FIG. 3 shows a second embodiment. In this embodiment, a plurality of projecting portions 10 are provided around the lower end of the cap 4 as a peripheral surface portion of the pouring plug 1 corresponding to the inner peripheral edge of the fitting hole B, and a dimension E of a spacing between the flange portion 6 and the projecting portion 10 is made larger than a dimension D of a thickness of the structural member so as to obtain a clearance 11 between the projecting portion 10 and the structural member.

FIG. 4 shows a third embodiment. Also in this embodiment, a dimension E of a spacing between the flange portion 6 and the projecting portion 10 is made larger than a dimension D of a thickness of the structural member so as to obtain a clearance 11 between the projecting portion 9 and the structural member, similar to the previous embodiment. The upper surface of the shoulder is directed sideward to be inclined so as to have a down grade, and the inclination is continuous in the projecting portion.

Figure 6:
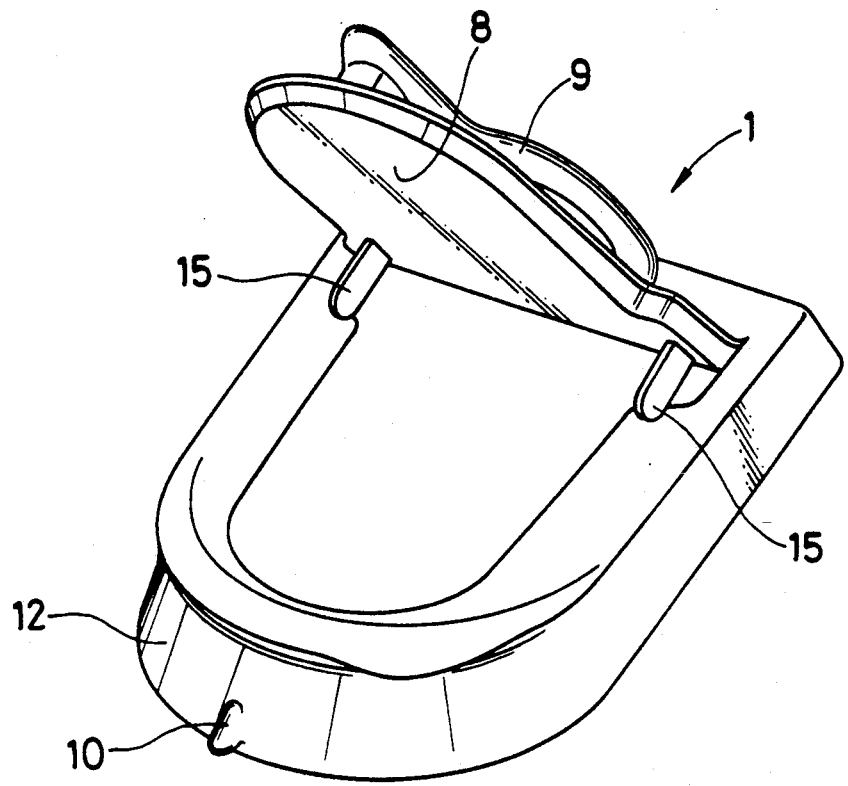
FIG. 6 is an explanatory view showing the open state of the fourth embodiment.

FIG. 5 shows a fourth embodiment. In this embodiment, a pouring plug 1 has a flat construction in which a flange portion 6 is integrally provided on an outer peripheral portion 12, the outer peripheral portion 12 being inwardly integrally provided with an inclined lid 8 through a thin-wall portion 13. The thin-wall portion 13 is cut by pulling a pull-ring 9 provided on the lid 8, and the lid 8 is turned through a self-hinge portion 14 positioned at the base end of the lid 8 to unseal the lid. As shown in FIG. 6, a projection 15 is provided at the base end to maintain the unsealed state of the lid. That is, the projection 15 is engaged with the pouring peripheral edge to maintain the unsealed state.

Figure 7:
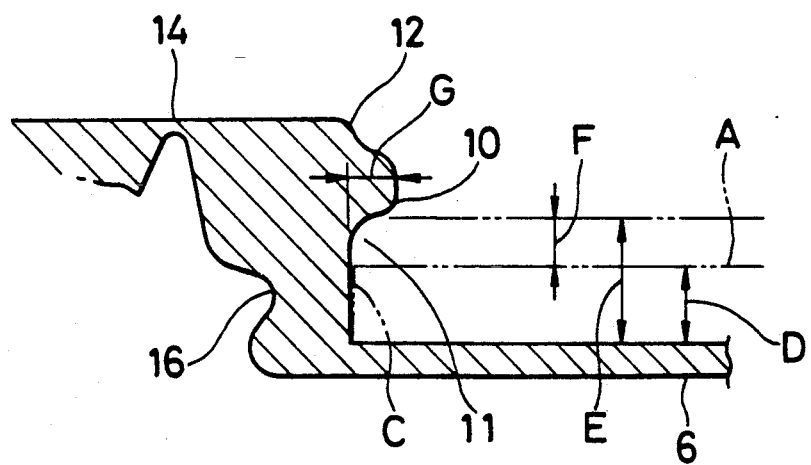
FIG. 7 is an explanatory view showing in section essential parts of the fourth embodiment.
Figure 8:
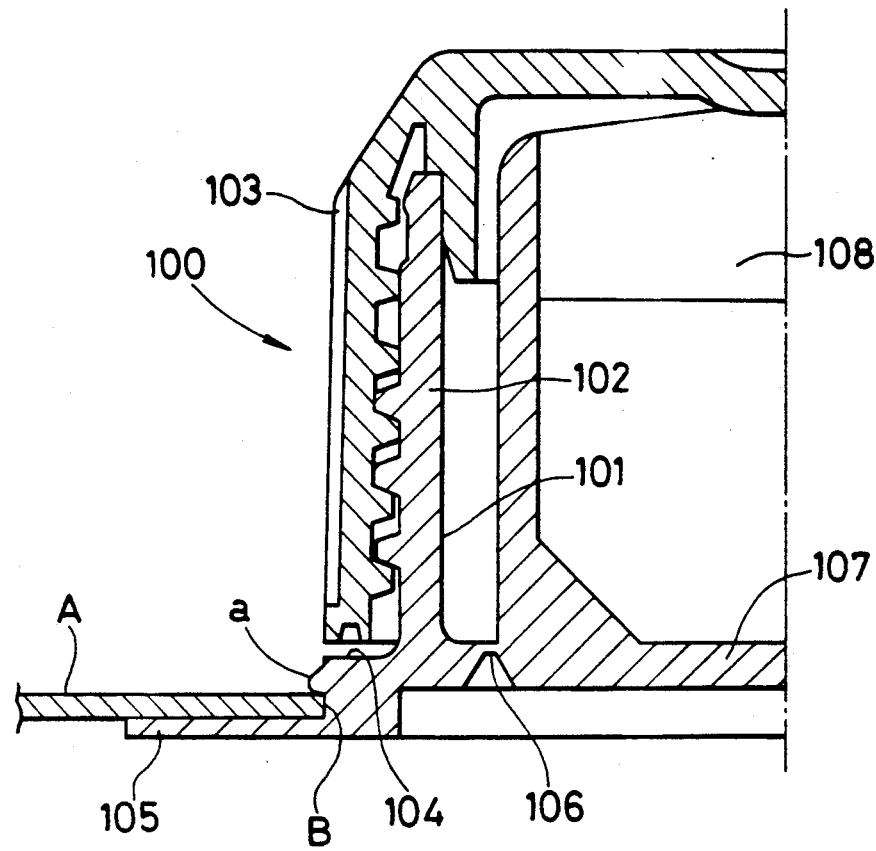
FIGS. 8 and 9 are explanatory views showing conventional examples.
Figure 9:
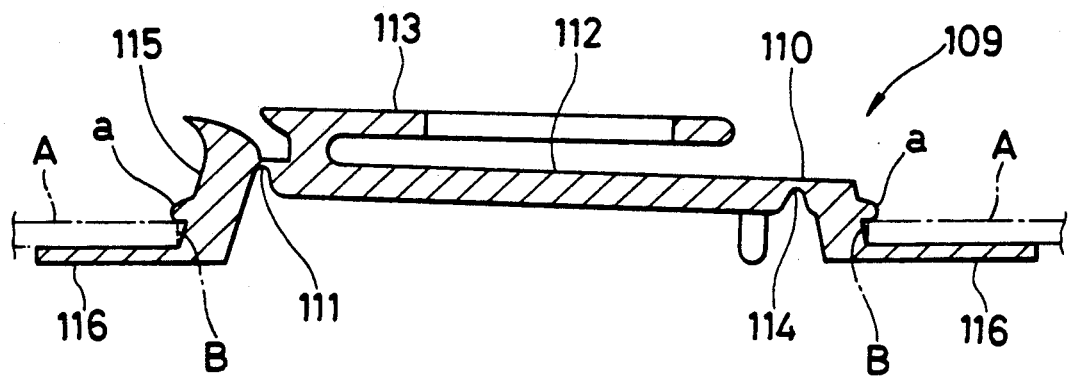
Figure 10:
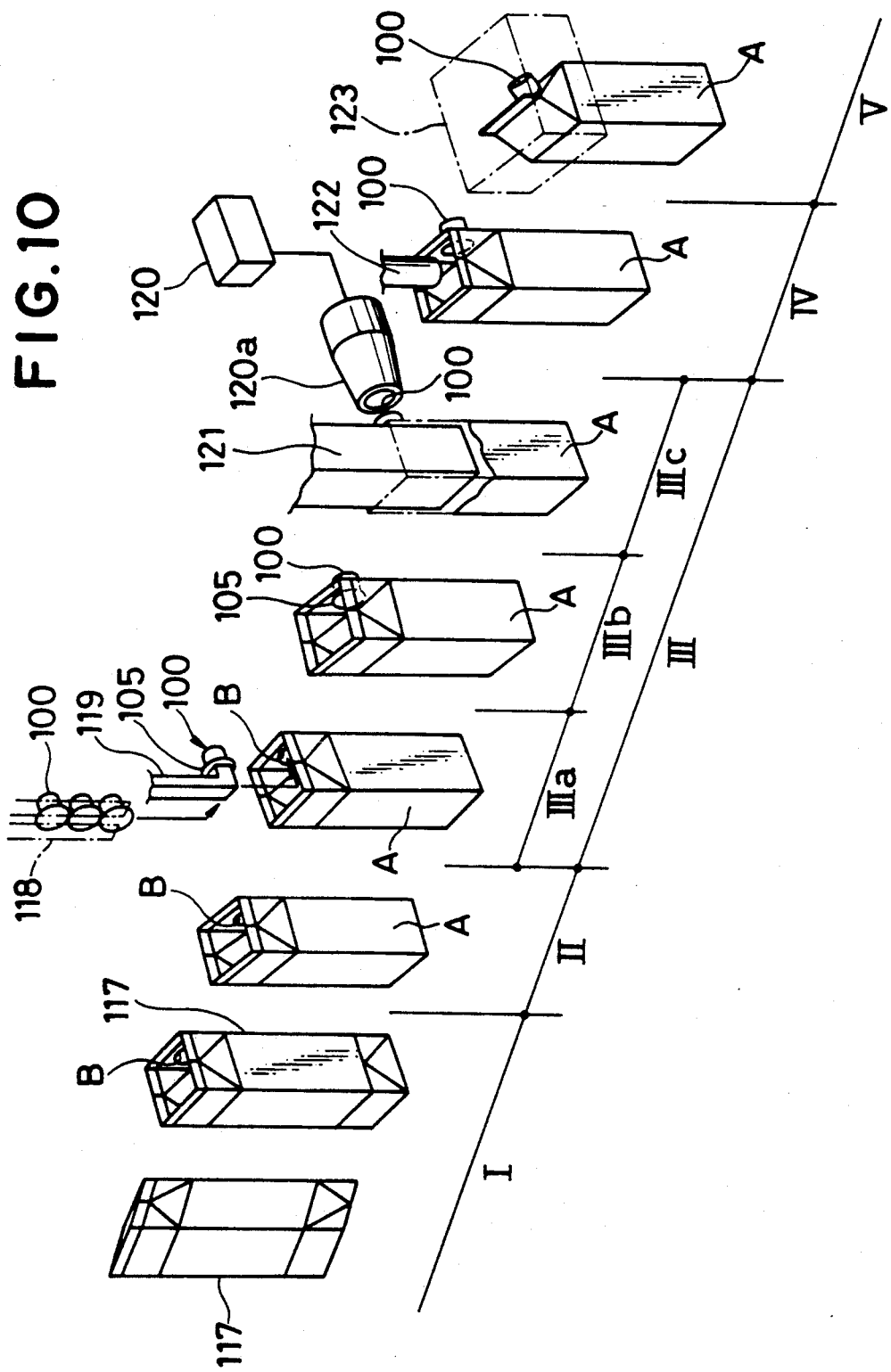
FIG. 10 is an explanatory view showing the manufacturing process of the liquid paper-container.
Figure 11:
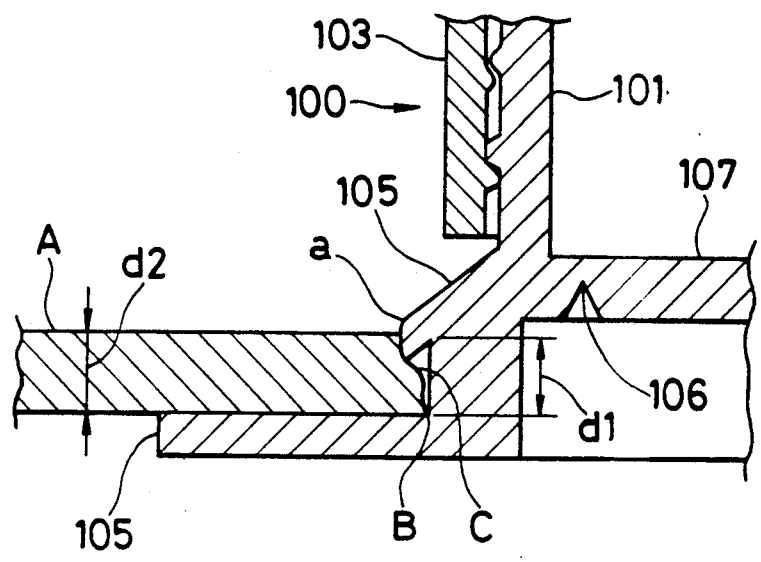
FIG. 11 is an explanatory view showing a modification of a projecting portion in the prior art.
Figure 12:
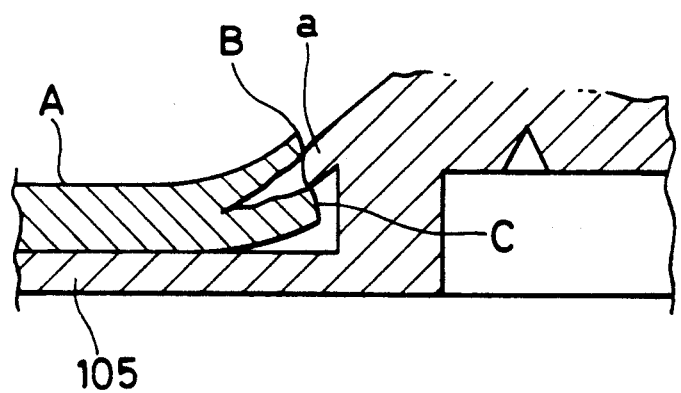
FIG. 12 is likewise an explanatory view showing a modification of a projecting portion and the broken state of a fitting hole in the prior art.

In the pouring plug 1 constructed as described above, on the side of the outer peripheral portion 12 which is a peripheral surface portion corresponding to the inner peripheral edge C of the fitting hole B, a projecting portion 10 is provided at a height position larger than a dimension D of a thickness of the structural member of the container body, similar to the previous embodiment. As shown in FIG. 7, a dimension E of a spacing between the flange portion 6 and the projecting portion 10 is made larger than a dimension D of a thickness of the structural member of the container body so as to obtain a clearance 11 between the projecting portion 10 and the structural member after the pouring plug 1 has been fitted. While in the drawing, one projecting portion is shown, it is to be noted that also in this embodiment, a plurality of projecting portions 10 are provided on the peripheral surface of the outer peripheral portion 12.

A length G of the projecting portion in the second to fourth embodiments is set similarly to that of the first embodiment.

Also in the pouring plug 1 of this embodiment, when the plug is fitted in the fitting hole, the projecting portion 10 gets over the inner peripheral edge C of the fitting hole B and is completely moved out before the flange portion 6 touch the peripheral surface of the fitting hole. The thus fitted pouring plug 1 is supported whereby the side of the outer peripheral surface 12 is in contact with the inner peripheral edge C of the fitting hole B. Even transmission of vibrations caused by the movement of the container body (for example, in the state of being opened as a blank instead of a cylindrical form) after fitting, the projecting portion and the flange portion touch the edge of the fitting hole by an amount of minute deviation to completely prevent the pouring plug 1 from being slipped out. The next step (i.e., the deposition of the flange portion) can be carried out without any trouble.

The dimension of the clearance is most preferably about half of the projecting dimension G of the projecting portion, but G=0.6 mm is employed. In the case where the thickness dimension D of the structural member is 0.4 to 0.6 mm, the dimension F of the clearance is preferably 0.2 to 1.0 mm, and preferably, D+F is set to about 1 mm.

In the above-described embodiment, between the thin-wall portion 7 and the flange portion 6 is provided an ultrasonic absorbing portion 16 so that vibrating energy caused by the ultrasonic deposition is not concentrated on the thin-wall portion 7. For example, as shown in the drawing, a thickness of a part of the shoulder 5 is reduced along the inner peripheral surface of the shoulder 5, and a thickness of a part of the inner peripheral surface 12 of the outer peripheral portion 12 is reduced along the aforesaid inner peripheral surface to provide the ultrasonic absorbing portion 16 so that the ultrasonic absorbing portion 16 itself vibrates the vibrating energy during the ultrasonic deposition so as not to directly transmit the vibrating energy to the thin-wall portion 7.

As described above, according to the present invention, the pouring plug is provided on the liquid paper-container, and has the flange portion corresponding to the peripheral surface portion of the fitting hole of the container body and is fitted from inside of the container body. The plurality of projecting portions are provided, at a height position larger than the thickness dimension of the structural member of the container body from the flange portion, on the peripheral surface portion corresponding to the inner peripheral edge of the fitting hole. Therefore, the length G projected externally is determined so that it will not touch the blank of the container even if the extreme end thereof is deformed when the pouring plug is fitted into the fitting hole of the container body. And, even if the projecting portion is deformed, the projecting portion positively gets over the inner peripheral edge of the fitting hole and is moved out on the surface side without being held by the inner peripheral edge of the fitting hole, whereby the temporary fixing of the pouring plug is assured without requiring any change of devices such as the fitting device to prevent the pouring plug from being slipped out or deviated. With regard to materials, the relatively soft polyethylene resin is used as previously mentioned, and even if the length of the projecting portion is decreased, the projecting portion can positively get over the inner peripheral edge of the fitting hole. Therefore, it is not necessary to use hard resins as in the prior art and to have the length of the projecting portion more than as needed. In addition, there are other practical effects such as the inner peripheral edge of the fitting hole not having to be scratched.

What is claimed is:

1. A pouring plug for a liquid paper-container or the like comprising:

a flange portion corresponding to a peripheral surface portion of a fitting hole of a container body and being fitted from inside of the container body;

an ultrasonic vibration absorbing portion formed on a periphery of the pouring plug; and a plurality of projecting portions located at a height position greater than a thickness dimension of a structural member of the container body from said flange portion, said plurality of projecting portions being further located on the pouring plug so as to be adjacent the peripheral surface portion corresponding to an inner peripheral edge of the fitting hole, said projecting portions being formed so that a projecting dimension of said projecting portions is less than a dimension of a spacing between said projecting portions and the fitting hole.

2. A pouring plug for a liquid paper-container or the like according to claim 1, further comprising: a lid integrally provided through a tearable thin-wall portion, wherein the thin-wall portion is formed so as to be rupturable by raising said lid which closes a pouring opening to unseal the pouring opening, said ultrasonic vibration absorbing portion being formed adjacent the thin-wall portion.

3. A pouring plug according to claim 1, each of said plurality of projecting portions are formed with roundishly curved ends.

4. A pouring plug comprising:

a flange portion corresponding to a peripheral surface portion of a fitting hole of a container body and being fitted from inside of the container body;

an ultrasonic vibration absorbing portion formed on a periphery of the pouring plug; and a plurality of projecting portions located at a height position greater than a thickness dimension of a structural member of the container body from said flange portion within the range of 0.2 mm to 1.0 mm, said plurality of projecting portions being further located on the pouring plug so as to be adjacent the peripheral surface portion corresponding to an inner peripheral edge of the fitting hole, said projecting portions being formed so that a projecting dimension of said projecting portions is less than a dimension of a spacing between said projecting portions and the fitting hole.

* * * * *